United States Patent [19]

Windsor

[11] Patent Number: 4,473,143
[45] Date of Patent: Sep. 25, 1984

[54] CLUTCH CONTROL MEANS

[75] Inventor: Harry M. Windsor, Leamington Spa, England

[73] Assignee: Automotive Products Limited, Leamington Spa, England

[21] Appl. No.: 361,096

[22] Filed: Mar. 23, 1982

[30] Foreign Application Priority Data

Apr. 8, 1981 [GB] United Kingdom ............ 8111075

[51] Int. Cl.³ .......................................... B60K 41/28
[52] U.S. Cl. ........................... 192/0.052; 192/0.076; 192/0.092; 192/3.58
[58] Field of Search ............... 192/0.033, 0.032, 0.052, 192/0.048, 0.073, 0.075, 0.076, 0.092, 3.58, 103 R; 74/866

[56] References Cited

U.S. PATENT DOCUMENTS

| | | | |
|---|---|---|---|
| 2,940,559 | 6/1960 | Bomhard | 192/0.076 X |
| 3,628,642 | 12/1971 | Ravenel | 192/3.58 X |
| 3,904,007 | 9/1975 | Braun et al. | 192/0.076 |
| 4,086,992 | 5/1978 | Hamada et al. | 192/0.076 |
| 4,294,341 | 10/1981 | Swart | 192/0.076 X |
| 4,295,551 | 10/1981 | Zimmermann et al. | 192/0.076 |

FOREIGN PATENT DOCUMENTS

| | | |
|---|---|---|
| 1049924 | 11/1966 | United Kingdom. |
| 1051741 | 12/1966 | United Kingdom. |
| 1091558 | 11/1967 | United Kingdom. |
| 1276554 | 6/1972 | United Kingdom. |
| 1449543 | 9/1976 | United Kingdom. |

Primary Examiner—George H. Krizmanich
Attorney, Agent, or Firm—Kemon & Estabrook

[57] ABSTRACT

An electronic control for a vehicle transmission having a clutch, the engagement of which is controlled in response to a clutch engagement signal. An electronic speed ratio logic for selection of the appropriate transmission gear ratio can produce a disengagement signal which overrides the engagement signal to cause disengagement of the clutch. A limiter is activated by a gear change signal from the logic to produce a limit signal which partially overrides the engagement signal to prevent full engagement of the clutch when the disengagement signal ceases, and the gear change signal is in operation.

3 Claims, 3 Drawing Figures

CLUTCH CONTROL MEANS

This invention relates to vehicle transmission electronic controls.

In our British Pat. Nos. 1 420 307 and 1 531 434 we have described an automatic gearbox electronic control. A problem associated with automatic gearboxes is that during gear changes the driver of the vehicle is subjected to a jerk as the clutch causes the engine speed and transmission speed to equalise.

The present invention seeks to overcome this problem.

Accordingly, there is provided a vehicle transmission electronic control having a clutch control means responsive to an engagement signal for engagement of the clutch, and an electronic speed ratio logic for the vehicle transmission which can produce a clutch disengagement signal which overrides the engagement signal to cause the clutch control to disengage the clutch during gear changes, characterised in that a clutch engagement limiting means is responsive to a change gear signal from the logic to produce a limit signal which partially overrides the engagement signal, so that when the disengagement signal ceases, the limit signal prevents full engagement of the clutch whilst the gear change signal is in operation.

Preferably the limit signal is caused to vary with throttle opening so that the greater the throttle opening the smaller the limit signal.

The advantage of limiting the degree of engagement of the clutch is that this limits torque transmission through the driven plate so that if the torque, that must be transmitted through the driven plate on a gear change, exceeds the capacity of the plate at that degree of engagement, the clutch slips smoothing out the gear change.

When the degree of clutch engagement is controlled by the throttle opening the engagement is varied over a throttle range allowing for a smooth take-up of the clutch.

The invention will be described by way of example and with reference to the accompanying drawings in which.

Figure 1:
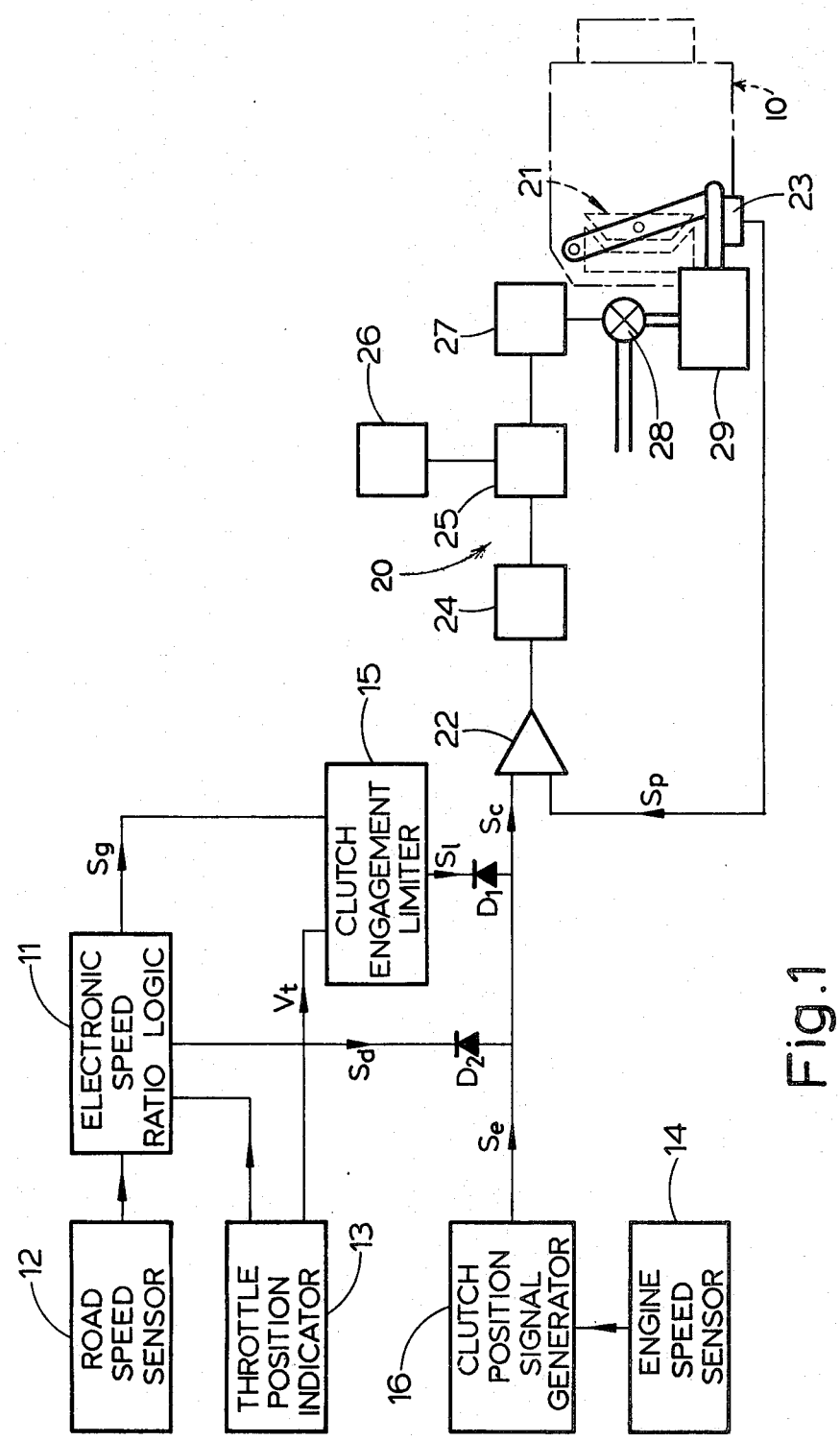
FIG. 1 is a schematic drawing of a clutch control system according to the invention.

With reference to FIG. 1 of the drawings, a vehicle automatic transmission 10 is controlled for its gear ratio selection by an electronic speed ratio logic 11. The logic 11 is responsive to transmission operating parameters and is supplied with signals from a ground speed sensor 12, and throttle position indicator 13, preferably a potentiometer on the carburettor butterfly valve.

The logic 11 controls the selection of the appropriate gear ratio in accordance with the input signals which it receives so that gear selection is automatic. The speed selection may be overridden by the use of a gear selector level (not shown) which would also supply an input signal to the logic 11. Such a system is fully described in our British Pat. Nos. 1 420 307 and 1 531 434. The logic 11 is connected to a clutch control means indicated generally at 20 and when the logic 11 changes the gear speed ratio, a clutch disengagement signal $S_d$ is sent to the clutch control means. The logic 11 is also connected to a clutch engagement limiting means 15 which is responsive to a gear change signal $S_g$ from the logic 11.

The clutch control means includes a clutch control loop comprising a comparator 22 which receives a command signal $S_c$ for comparison with a signal $S_p$ from a travel transducer 23 responsive to clutch position. The command signal $S_c$ is the resultant of an engagement signal $S_e$ from a clutch engagement signal generator means 16, the disengagement signal $S_d$ from the logic 11, and a limit signal $S_1$ from the clutch engagement limiting means 15. The engagement signal generator means 16 is connected to an engine speed sensor 14 and the signal $S_e$ is such that above a predetermined engine speed, the clutch is fully engaged. During gear changes the disengagement signal $S_d$ from the command 11 can, as will be described, override the engagement signal $S_e$ from the generator means 16, and the limit signal $S_1$ can be utilised to modify the engagement signal $S_e$ either alone, or together with the disengagement signal $S_d$. The engagement limiting means 15 is connected to the throttle indicator 13 and receives a voltage signal $V_t$ which is inversely proportional to throttle opening i.e. $V_t = (1 - \text{throttle opening}) k$. A diode $D_1$ is placed in the connection between the limiting means 15 and the engagement signal $S_e$ to make signal $S_1$ effective in one direction only.

The workings of the clutch engagement signal generator means 16 and the clutch control means are fully explained in our published European Patent Application No. 0038113 and form no part of the invention. The signal from the comparator 22 is then fed into a phase-gain shaping network 24, introduced to ensure the system stability, a mark space ratio modulator and oscillator, 25 and 26 respectively, and is then utilised via an ouput 27 to control a solenoid valve 28. The solenoid valve controls the hydraulic flow in a hydraulic actuator 29. The actuator 29 operates the clutch 21, and the mark/space ratio of the signal fed into the valve 28 determines the flow rate and hence the hydraulic pressure in the actuator 29 and hence the state of engagement of the clutch. The actuator 29 is operated through the control loop to equalise the two signals $S_c$ and $S_p$. Hence the state of engagement of the clutch is dictated by the size of the signal $S_c$.

When the vehicle is being driven the engagement signal $S_e$ from the clutch position generator means 16 is fully positive and the clutch is fully engaged, a signal $S_d$ from the logic control 11 is positive, and the clutch engagement limiter 15 is switched off. Since both the signal $S_e$ and $S_d$ are fully positive, the command signal $S_c$ is positive and the clutch remains fully engaged. A diode $D_2$ in connection between logic 11 and the signal $S_e$ prevents the signals $S_d$ from operating in both directions.

Figure 3:
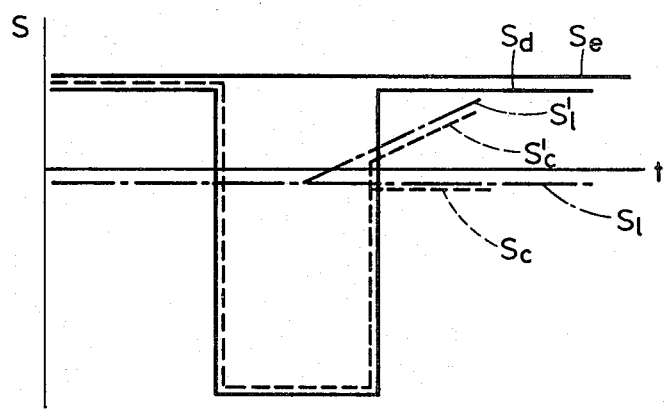
FIG. 3 is a graph of the signal strengths (s) versus time (t).

With reference also to FIG. 3 of the drawings, the command signal $S_c$ is fully positive and the clutch engaged, when the logic 11 changes the gear speed ratio the disengagement signal $S_d$ is caused to go negative, and overrides the signal $S_e$ causing the command signal $S_c$ into the control loop to go negative and cause the clutch 21 to immediately disengage.

The gear change signal $S_g$ from the logic 11 causes the limiting means 15 to produce a limit signal $S_1$, which is negative relative to the engagement signal $S_e$ at this point and so does not effect the clutch disengagement signal. When the gear change signal $S_d$ returns to a fully positive value to allow the clutch to re-engage the limit signal $S_1$ is still negative and reduces the value of the command signal $S_c$ into the control loop, so that the clutch is prevented from fully engaging whilst the limit signal is operative. The period for which the limit signal is produced is coincided with the gear change by the logic 11.

By connecting the limit means 15 to the throttle indicator 13 the signal $S_1$ is caused to become more positive with increasing throttle opening so that the command signal $S_c$ adjusts the clutch torque capacity in accordance with the engine output. This is shown by the curves $S'_1$ and $S'_c$ in FIG. 3. When the signal $S_1$ is cut off the clutch 21 becomes fully engaged.

Figure 2:
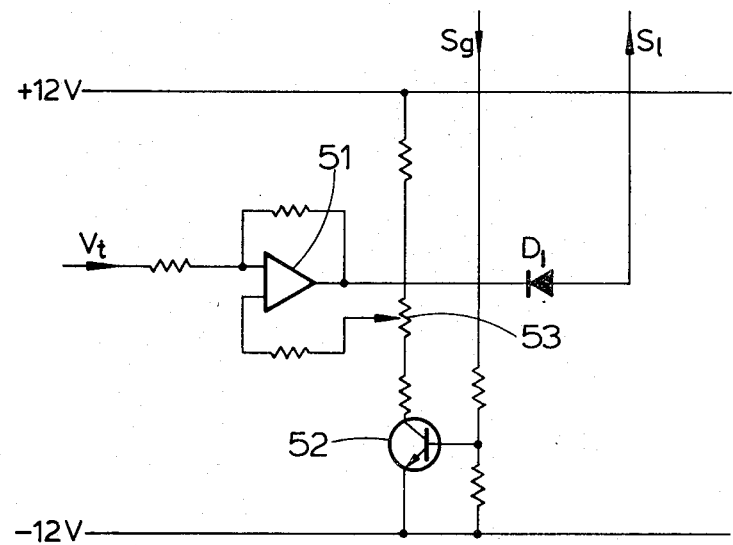
FIG. 2 is a clutch engagement limiter as is utilised in the above system.

The limiting means is shown in detail in FIG. 2 and comprises an inverting amplifier 51 that receives the throttle position signal $V_t$. The amplifier has a low gain of about one half ($\frac{1}{2}$). The other input of the amplifier is connected across a pre-set potentiometer 53 to set the amplifier at its operational voltage level e.g. if the voltage $V_t$ fluctuates between 0–12 volts, the amplifier output can be set to fluctuate at $6\pm 3$ volts. The limiting means is switched on and off by a transistor 52 which is operated by gear change signals $S_8$ received from the logic 11.

What I claim as my invention and desire to secure by Letters Patent in the United States is:

1. In a vehicle transmission having a clutch therein: a transmission control system comprising;
    a clutch engagement signal generator means which produces an engagement signal for control of the clutch;
    a clutch control means responsive to the engagement signal;
    an electronic speed ratio logic for selection of an appropriate gear ratio in the transmission and which can produce a clutch disengagement signal which overrides the engagement signal to cause the clutch control means to disengage the clutch during gear changes, and which also produces a gear change signal during the gear changes;
    and a clutch engagement limiting means which is responsive to the gear change signal from the logic to produce a limit signal which partially overrides the engagement signal, so that during gear changes when the disengagement signal from the logic has ceased, the limit signal prevents full engagement of the clutch whilst the gear change signal is in operation.

2. A control system as claimed in claim 1, wherein a throttle position indicator produces a throttle signal indicative of throttle opening, and the limiting means receives the throttle signal and the limit signal is caused to vary with a range of throttle opening so that the greater the throttle opening the smaller the limit signal.

3. A control system as claimed in claim 2, wherein the limiting means comprises an inverting amplifier that has one input that receives the throttle signal, and has another input that is connected to a potentiometer which sets the amplifier operational voltage, and its output connected to the engagement signal.

* * * * *